(12) United States Patent
Griffiths et al.

(10) Patent No.: US 11,208,917 B2
(45) Date of Patent: Dec. 28, 2021

(54) TURBINE ENGINE FLEET WASH MANAGEMENT SYSTEM

(71) Applicant: Rolls-Royce Corporation, Indianapolis, IN (US)

(72) Inventors: George F. Griffiths, Southlake, TX (US); Prahlad Rao Dilip Heggere, Carmel, IN (US); Jeffrey A. Green, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 43 days.

(21) Appl. No.: 16/506,542

(22) Filed: Jul. 9, 2019

(65) Prior Publication Data

US 2019/0330998 A1 Oct. 31, 2019

Related U.S. Application Data

(60) Division of application No. 15/796,117, filed on Oct. 27, 2017, now Pat. No. 10,392,964, which is a (Continued)

(51) Int. Cl.
*F01D 25/00* (2006.01)
*B64F 5/30* (2017.01)
(Continued)

(52) U.S. Cl.
CPC ............ *F01D 25/002* (2013.01); *B08B 3/003* (2013.01); *B64F 5/30* (2017.01); *F01D 21/003* (2013.01);
(Continued)

(58) Field of Classification Search
CPC ...................................................... B08B 3/003
See application file for complete search history.

(56) References Cited

U.S. PATENT DOCUMENTS 2,273,984 A 2/1942 William
3,623,668 A 11/1971 Freid et al.
(Continued)

FOREIGN PATENT DOCUMENTS

DE 102008047493 A1 4/2010
EP 1513085 A1 3/2005
(Continued)

*Primary Examiner* — Jason Y Ko
(74) *Attorney, Agent, or Firm* — Barnes & Thornburg LLP

(57) ABSTRACT

A turbine engine fleet wash management system is configured to electronically communicate with a turbine engine system, a fleet management service, and a cleaning management service. The turbine engine fleet wash system causes a cleaning of a turbine engine to occur based on information received from the turbine engine system and other sources. The turbine engine fleet wash management system includes a cleaning schedule optimizer that generates a cleaning schedule based on engine health monitoring data, engine operation data, maintenance schedules for the turbine engine, and cleaning regimen data. The cleaning schedule optimizer estimates turbine engine performance improvements based on the selected cleaning regimen, and calculating an estimate of carbon credits earned based on the predicted improvement in turbine engine performance.

12 Claims, 5 Drawing Sheets

Related U.S. Application Data continuation of application No. 14/749,241, filed on Jun. 24, 2015, now Pat. No. 9,835,048.

(60) Provisional application No. 62/087,000, filed on Dec. 3, 2014.

(51) Int. Cl.
*B08B 3/00* (2006.01)
*F01D 21/00* (2006.01)

(52) U.S. Cl.
CPC ...... F05D 2220/32 (2013.01); F05D 2270/11 (2013.01)

(56) References Cited

U.S. PATENT DOCUMENTS

| | | |
|---|---|---|
| 3,778,170 A | 12/1973 | Howell et al. |
| 4,314,671 A | 2/1982 | Blum |
| 4,834,912 A | 5/1989 | Hodgens, II et al. |
| 5,213,263 A | 5/1993 | Corona |
| 5,679,174 A | 10/1997 | Buongiorno |
| 6,126,089 A | 10/2000 | Williamson et al. |
| 6,473,677 B1 * | 10/2002 | Hershey ............. G06Q 10/06 701/29.4 |
| 6,478,033 B1 | 11/2002 | Foster |
| 6,659,715 B2 | 12/2003 | Kuesters et al. |
| 7,033,135 B2 | 4/2006 | Mortzheim et al. |
| 7,033,979 B2 | 4/2006 | Herwig et al. |
| 8,245,952 B2 | 8/2012 | de la Bruere-Terreault et al. |
| 8,303,243 B2 | 11/2012 | Fish et al. |
| 8,337,630 B2 | 12/2012 | de la Bruere-Terreault et al. |
| 8,479,754 B2 | 7/2013 | Hjerpe |
| 8,523,514 B2 | 9/2013 | Eastwood et al. |
| 2005/0096832 A1 | 5/2005 | Takada et al. |
| 2010/0212703 A1 | 8/2010 | de la Bruere-Terreault et al. |
| 2011/0005554 A1 | 1/2011 | Du Plessis |
| 2011/0112991 A1 | 5/2011 | Scheid et al. |
| 2012/0134777 A1 | 5/2012 | Eleftheriou et al. |
| 2014/0144151 A1 | 5/2014 | Bifulco |
| 2014/0174474 A1 | 6/2014 | Ekanayake et al. |
| 2015/0122292 A1 | 5/2015 | McDermott |
| 2016/0067750 A1 | 3/2016 | Griffiths et al. |

FOREIGN PATENT DOCUMENTS

| | | |
|---|---|---|
| EP | 2492199 A2 | 8/2012 |
| ES | 2362964 T3 | 7/2001 |
| GB | 2207210 A | 1/1989 |
| WO | 2005077554 A1 | 8/2005 |
| WO | 2010011886 A1 | 1/2010 |
| WO | 2013017854 A1 | 2/2013 |
| WO | 2015051146 A1 | 4/2015 |

* cited by examiner

TURBINE ENGINE FLEET WASH MANAGEMENT SYSTEM

CROSS REFERENCE TO RELATED APPLICATIONS

This application is a divisional of U.S. patent application Ser. No. 15/796,117, filed 27 Oct. 2017, which is a continuation of U.S. patent application Ser. No. 14/749,241, filed 24 Jun. 2015, which granted as U.S. Pat. No. 9,835,048 on 5 Dec. 2017 and which claims priority to and the benefit of U.S. Provisional Patent Application No. 62/087,000, filed 3 Dec. 2014, the disclosures of all of which are now expressly incorporated herein by reference.

FIELD OF THE DISCLOSURE

The present disclosure relates generally to gas turbine engines and more specifically to systems that manage the cleaning of gas turbine engines.

BACKGROUND

Gas turbine engines are used to power aircraft, watercraft, generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where energy is extracted to drive the compressor and the fan. Leftover products of the combustion are exhausted out the engine core to provide additional thrust.

Dirt and grime is accumulated in gas turbine engines from atmospheric air ingested and fuel burned during operation. As dirt and grime build up in turbofan engines, the performance of those engines may be reduced due to aerodynamic and frictional losses. To reduce the dirt and grime in the turbofan of a gas turbine engine, a cleaning agent (usually water) may be sprayed into the engine core.

SUMMARY

The present application discloses one or more of the features recited in the appended claims and/or the following features which, alone or in any combination, may comprise patentable subject matter.

In an example 1, a system to optimize cleaning of a turbine engine includes one or more computing devices configured to: by a communication link between a turbine engine and a cleaning schedule optimizer, receive engine health data from the turbine engine over time during operation of the turbine engine; by the cleaning schedule optimizer, periodically execute an cleaning optimization routine to evaluate instances of the engine health data using one or more cleaning schedule optimization criteria; and in response to one or more instances of the engine health data meeting an engine health criterion, cause a foamed cleaning agent to be discharged into the turbine engine according to an optimized engine cleaning schedule.

An example 2 includes the subject matter of example 1, wherein the cleaning schedule optimizer only executes the cleaning optimization routine if the system determines that engine performance is degrading. An example 3 includes the subject matter of example 1 or example 2, wherein the cleaning schedule optimizer is configured to query an operational database to obtain information about the use of the turbine engine and incorporate the turbine engine use information into the optimization routine. An example 4 includes the subject matter of any of examples 1-3, wherein the cleaning schedule optimizer is configured to query an environmental database for information about operating environments of the turbine engine and incorporate the operating environment information into the optimization routine. An example 5 includes the subject matter of any of examples 1-4, wherein the cleaning schedule optimizer is configured to query a maintenance database for information about the maintenance history of the turbine engine and incorporate the maintenance history information into the optimization routine. An example 6 includes the subject matter of any of examples 1-5, wherein the cleaning schedule optimizer is configured to query a cleaning parameters database for information about the different cleaning regimens available for use on the turbine engine and incorporate the cleaning regimen information into the optimization routine. An example 7 includes the subject matter of any of examples 1-6, and includes a fuel efficiency calculator electrically connected to an engine health monitor, wherein the fuel efficiency calculator is configured to receive one or more engine performance parameters and generate fuel efficiency parameters based upon the received engine performance parameters. An example 8 includes the subject matter of example 7, wherein the fuel efficiency calculator is configured to calculate the changes in fuel consumption in the engine over time. An example 9 includes the subject matter of example 8, wherein the fuel efficiency calculator is configured to calculate the changes in operating cost over time based on the changes in fuel consumption over time. An example 10 includes the subject matter of example 7, and includes a carbon credit calculator configured to receive the fuel efficiency parameters and the engine performance parameters, estimate a change in fuel consumption based upon the optimized cleaning schedule, and use the estimated change in fuel consumption to calculate an estimated number of carbon credits earned. An example 11 includes the subject matter of example 10, and includes a notification system in communication with the cleaning schedule optimizer and coupled to a network, wherein the notification system is configured to send a notification to an owner of the turbine engine, and wherein the notification comprises the cleaning schedule, the estimated fuel consumption, and the estimated carbon credits.

In an example 12, an engine cleaning optimizer embodied in one or more machine accessible storage media includes instructions executable by a computing system comprising one or more computing devices to cause the computing system to: periodically receive instances of engine health monitoring data produced by a turbine engine during operation of the turbine engine; with the instances of engine health monitoring data, calculate an engine health parameter; with the engine health parameter: compute an indicator of engine performance degradation; compute an indicator of fuel consumption; and with the fuel consumption indicator, estimate a carbon credit that would result from cleaning the turbine engine; with the engine performance indicator, the fuel consumption indicator, and the estimated carbon credit, generate an optimized cleaning schedule; and initiate discharge of a foamed cleaning agent into the turbine engine in accordance with the optimized engine cleaning schedule.

An example 13 includes the subject matter of example 12, and includes instructions executable to generate the cleaning schedule for the turbine engine system by algorithmically evaluating the indicator of engine performance degradation.

An example 14 includes the subject matter of example 13, and includes instructions executable to generate the cleaning schedule for the turbine engine system by algorithmically evaluating a cost of cleaning. An example 15 includes the subject matter of example 14, and includes instructions executable to generate the cleaning schedule for the turbine engine system by algorithmically evaluating an estimated fuel savings. An example 16 includes the subject matter of example 15, and includes instructions executable to generate the cleaning schedule for the turbine engine system by algorithmically evaluating an amount of time until the next schedule maintenance for the engine. An example 17 includes the subject matter of example 16, and includes instructions executable to generate the cleaning schedule for the turbine engine system by algorithmically evaluating a likely effectiveness of the cleaning. An example 18 includes the subject matter of example 17, and includes instructions executable to generate the cleaning schedule for the turbine engine system by algorithmically evaluating an estimate of carbon credits earned. An example 19 includes the subject matter of any of examples 12-18, and includes instructions executable to modify the optimized cleaning schedule in response to data indicative of a maintenance schedule for the turbine engine. An example 20 includes the subject matter of any of examples 12-19, and includes instructions executable to communicate with a computing system of the engine manufacturer to schedule maintenance intervals based on data indicative of parts or modules that need replacement. An example 21 includes the subject matter of any of examples 12-20, and includes instructions executable to issue a prompt to prevent the occurrence of a scheduled cleaning cycle in response to a determination that a regularly scheduled maintenance is to occur. An example 22 includes the subject matter of any of examples 12-21, and includes instructions executable to coordinate the optimized cleaning schedule with a maintenance schedule and an operational schedule of the turbine engine. An example 23 includes the subject matter of any of examples 12-22, and includes instructions executable to, with the optimized cleaning schedule, specify a time interval between cleanings, the duration of a cleaning, and a composition of cleaning solution used in a cleaning of the turbine engine.

These and other features of the present disclosure will become more apparent from the following description of the illustrative embodiments.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
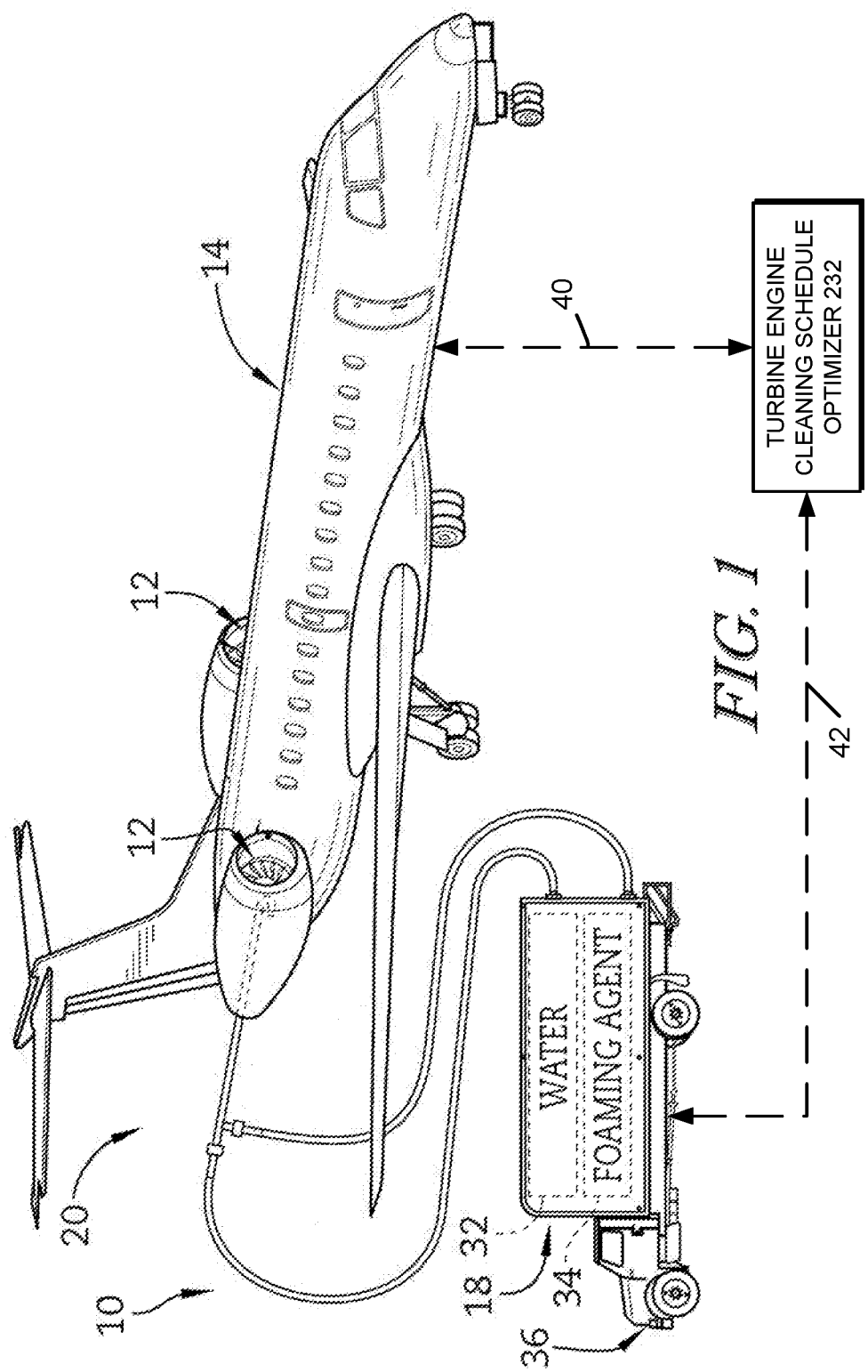
FIG. 1 is a simplified perspective view of at least one embodiment of a turbine engine cleaning schedule optimizer in electronic communication with an aircraft and a cleaning system for cleaning gas turbine engines.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Referring now to FIG. 1, an illustrative cleaning system 10 adapted for cleaning gas turbine engines 12 used in an aircraft 14 is shown. The cleaning system 10 includes a mobile supply unit 18 and a wand 20 coupled to the supply unit 18. The wand 20 is configured to produce foamed cleaner and to discharge the foamed cleaner into the gas turbine engines 12 so that the foamed cleaner can remove dirt and grime built up in the turbine engines 12. The wand 20 of the illustrative embodiment sprays foamed cleaner into the gas turbine engines 12 while the rotating components of the engines 12 are dry motored so that the foamed cleaner is pulled through the engines 12 as suggested in FIG. 1.

The mobile supply unit 18 included in the cleaning system 10 illustratively includes a water supply 32 and a foaming cleaner supply 34 mounted to a transport vehicle 36 as shown in FIG. 1. The water supply 32 illustratively stores and provides de-ionized water to the wand 20. The foaming cleaner supply 34 stores and provides a foaming cleaner to the wand 20. For illustrative purposes, the mobile supply unit 18 is shown in the back of a truck; however, in other embodiments, the mobile supply unit 18 may be incorporated into a work cart, trailer, or other type of vehicle or support structure. Illustrative embodiments of the cleaning system 10, including embodiments of the wand 20, are described in U.S. Provisional Patent Application Ser. No. 62/021,939 filed Jul. 8, 2014 and entitled "Cleaning System for Turbofan Gas Turbine Engines," U.S. Provisional Patent Application Ser. No. 62/032,751 filed Aug. 4, 2014 and entitled "Aircraft Engine Cleaning System," and U.S. Provisional Patent Application Ser. No. 62/048,625 filed Sep. 10, 2014 and entitled "Wand for Gas Turbine Engine Cleaning."

A turbine engine cleaning schedule optimizer 232 is in bi-directional electronic communication with components of the gas turbine engines 12 and the cleaning system 10 by communication links 40 and 42 (e.g., wired and/or wireless, direct or indirect, connections, as needed). As described in more detail below, the illustrative turbine engine cleaning schedule optimizer 232 can automatically determine or predict when a cleaning of a turbine engine should occur and indicate that the cleaning should occur, and, in some embodiments, initiates such a cleaning, in accordance with a schedule that is optimized based on information about the turbine engine 12. The turbine engine information includes, but is not limited to, data indicative of the current and past performance of the turbine engine 12, the environmental conditions in which the turbine engine 12 has operated, the maintenance schedule of the turbine engine 12, estimated carbon-credits earned by operation of the aircraft driven by the turbine engine 12, and/or the predicted efficacy of a selected or recommended cleaning regimen. For example, some embodiments of the cleaning schedule optimizer 232 can predict a cleaning schedule that is optimal given a specified optimization objective (e.g., prolong engine life, improve performance, or improve efficiency), based on historical engine data and/or other known information.

Figure 2:
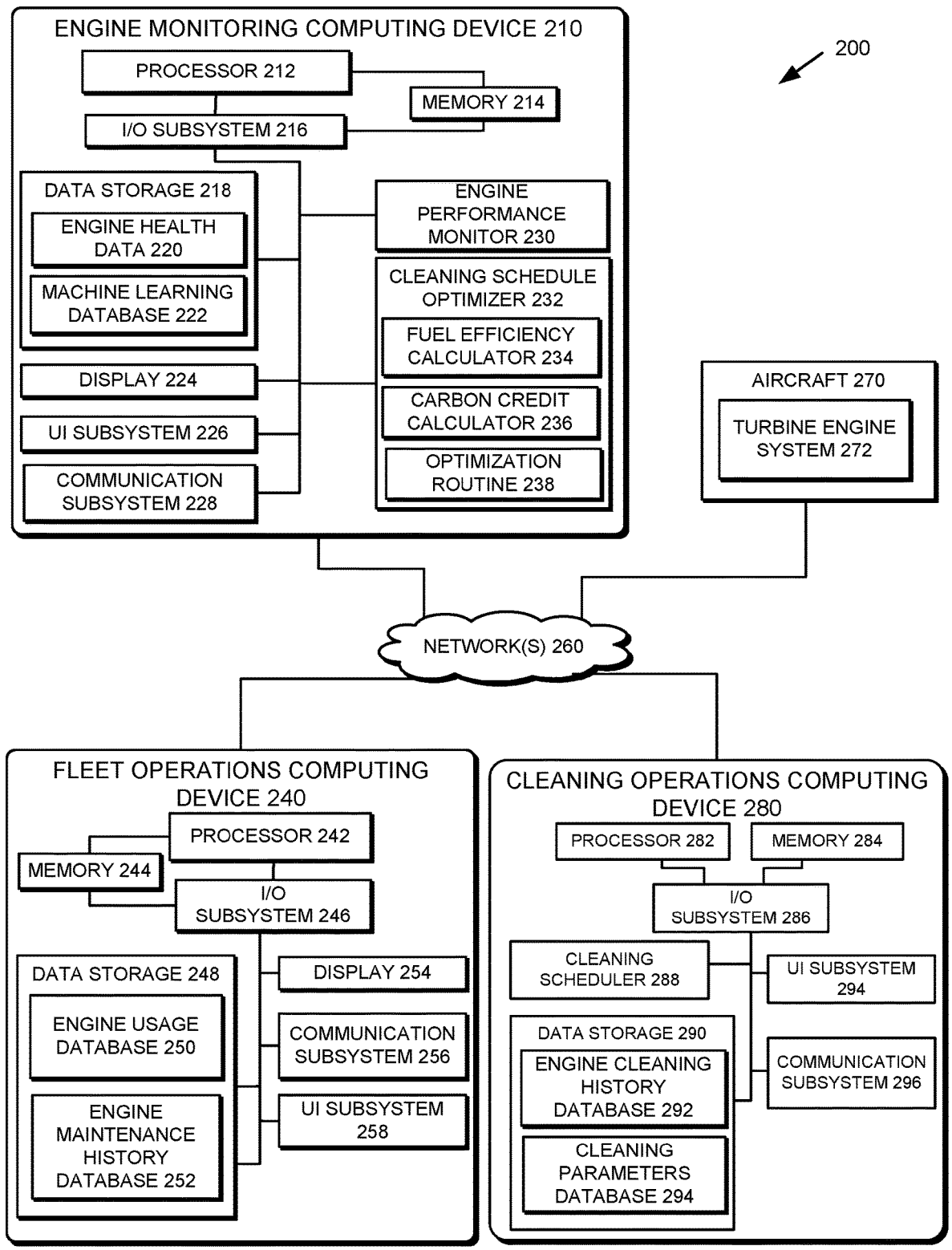
FIG. 2 is a simplified block diagram of at least one embodiment of a computing system for managing turbine engine cleaning as disclosed herein.

Referring now to FIG. 2, an embodiment of a fleet wash management system 200 for managing turbine engine cleaning for a fleet of aircraft is shown. The illustrative fleet management system 200 includes an engine monitoring computing device 210, a fleet operations computing device 240, one or more networks 260, one or more aircraft systems 270 (e.g., aircraft 14), and one or more cleaning operations computing devices 280. Each of the components of the fleet management system 200 includes computer hardware, software, firmware, or a combination thereof, configured to perform the features and functions described herein.

The illustrative engine monitoring computing device 210 includes an engine performance monitor 230 and the cleaning schedule optimizer 232. The cleaning schedule optimizer 232 can create one or more cleaning schedules for a gas turbine engine 12. The cleaning schedule optimizer 232 executes one or more mathematical optimization routines to "optimize" the cleaning schedule for the turbine engine 12 (or for the aircraft driven by the turbine engine 12), according to one or more desired or selected optimization criteria. The cleaning schedule optimization criteria includes, for example: maximization of engine performance, minimization of the turbine engine's carbon footprint, and/or minimization of cleaning or maintenance costs to the owner/operator of the turbine engine.

In more detail, the engine monitoring computing device 210 includes hardware, firmware, and/or software components that are capable of performing the functions disclosed herein, including the functions of the engine performance monitor 230 and the cleaning schedule optimizer 232. The illustrative engine monitoring computing device 210 includes at least one processor 212 (e.g. a controller, microprocessor, microcontroller, digital signal processor, etc.), memory 214, and an input/output (I/O) subsystem 216. Portions of the engine monitoring computing device 210 may be embodied as any type of computing device such as a desktop computer, laptop computer, or mobile device (e.g., a tablet computer, smart phone, body-mounted device or wearable device, etc.), a server, an enterprise computer system, a network of computers, a combination of computers and other electronic devices, or other electronic devices. Although not specifically shown, it should be understood that the I/O subsystem 216 typically includes, among other things, an I/O controller, a memory controller, and one or more I/O ports. The processor 212 and the I/O subsystem 216 are communicatively coupled to the memory 214. The memory 214 may be embodied as any type of suitable computer memory device (e.g., volatile memory such as various forms of random access memory).

The I/O subsystem 216 is communicatively coupled to a number of hardware, firmware, and/or software components, including a data storage device 218, a display 224, a user interface subsystem 226, a communication subsystem 228, the engine performance monitor 230 and the cleaning schedule optimizer 232. The data storage device 218 may include one or more hard drives or other suitable persistent data storage devices (e.g., flash memory, memory cards, memory sticks, and/or others). Engine health data 220 and a machine learning database 222 reside at least temporarily in the data storage device 218 and/or other data storage devices of the fleet management system 200 (e.g., data storage devices that are "in the cloud" or otherwise connected to the engine monitoring computing device 210 by a network 260). Portions of the engine performance monitor 230 and the cleaning schedule optimizer 232 may reside at least temporarily in the data storage device 218 and/or other data storage devices that are part of the fleet management system 200. Portions of the engine health data 220, the machine learning database 222, the engine performance monitor 230 and the cleaning schedule optimizer 232 may be copied to the memory 214 during operation of the engine monitoring computing device 210, for faster processing or for other reasons. The display 224 may be embodied as any suitable type of digital display device, such as a liquid crystal display (LCD), and may include a touchscreen. The user interface subsystem 226 includes one or more user input devices (e.g., the display 224, a microphone, a touchscreen, keyboard, virtual keypad, etc.) and one or more output devices (e.g., audio speakers, LEDs, additional displays, etc.).

The communication subsystem 228 may communicatively couple the engine monitoring computing device 210 to other computing devices and/or systems by, for example, one or more networks 260. The network(s) 260 may be embodied as, for example, a cellular network, a local area network, a wide area network (e.g., Wi-Fi), a personal cloud, a virtual personal network (e.g., VPN), an enterprise cloud, a public cloud, an Ethernet network, and/or a public network such as the Internet. The communication subsystem 228 may, alternatively or in addition, enable shorter-range wireless communications between the engine monitoring computing device 210 and other computing devices, using, for example, BLUETOOTH and/or Near Field Communication (NFC) technology. Accordingly, the communication subsystem 228 may include one or more optical, wired and/or wireless network interface subsystems, cards, adapters, or other devices, as may be needed pursuant to the specifications and/or design of the particular engine monitoring computing device 210.

The illustrative communication subsystem 228 communicates output of one or more of the engine performance monitor 230 and the cleaning schedule optimizer 232 to the fleet operations computing device 240 and/or the cleaning operations computing device 280, via a network 260. For example, portions of engine health data 220 and/or optimized cleaning schedule data 426, described below, may be supplied to the fleet operations computing device 240 and/or the cleaning operations computing device 280.

Computing devices 240 and 280 utilize the output of the cleaning schedule optimizer 232, such as scheduling notifications, to schedule a cleaning of gas turbine engines. As such, computing devices 240 and 280 communicate through communication subsystem 256 and communication subsystem 296 to ensure that a cleaning occurs at a convenient time for both the vehicle whose engine is being cleaned and the party providing the cleaning.

The engine performance monitor 230 is embodied as one or more hardware components, software components or computer-executable components and data structures for monitoring and processing data received from a turbine engine system 272. The engine performance monitor 230 monitors the health of the turbine engine system 272 by receiving engine health data 410, and other related inputs, from an aircraft 270 (from, e.g., a turbine engine system 272 of the aircraft 270). The engine performance monitor 230 stores portions of the engine health data 410 in the engine health database 220, and thereby tracks the engine health data 410 over time. Based on its analysis of the engine health data 410, the engine performance monitor 230 generates an assessment of engine performance and/or engine efficiency.

The engine performance monitor 230 provides engine performance information (e.g., a data value indicative of an engine performance assessment, such as an engine performance rating or score) to the cleaning schedule optimizer 232.

The cleaning schedule optimizer 232 utilizes the engine performance information generated by the engine performance monitor 230 to predict when a cleaning will be necessary or desired in order to maintain or improve the performance of the turbine engine system 272. As used herein, a "schedule" may refer to a single discrete cleaning event or to a series of cleaning events that are planned according to fixed or variable time intervals. For example, if an engine 12's performance is severely degraded, the cleaning schedule optimizer 232 may initiate a single cleaning event; whereas, if an engine 12 is currently operating normally, the cleaning schedule optimizer 232 may generate a cleaning schedule for the engine 12 at optimized time intervals based on a number of cleaning schedule criteria including the engine 12's flight plans, normal operating conditions (e.g., short or long duration missions, altitude, humidity, frequency of accelerations vs. cruising segments, etc.), characteristics of the cleaning technique or cleaning solution used, and/or other factors.

The cleaning schedule optimizer 232 is embodied as one or more hardware components, software components or computer-executable components and data structures including a fuel efficiency calculator 234, a carbon credit calculator 236, and an optimization routine 238. The illustrative cleaning schedule optimizer 232 interfaces with the engine performance monitor 230 to create a cleaning schedule for a turbine engine 12, in order to maximize performance of the turbine engine 12 and minimizes maintenance costs. For example, the fuel efficiency calculator subsystem 234 and the carbon credit calculator subsystem 236 obtain engine performance data 412 from the engine performance monitor 230 to estimate the improved fuel efficiency and estimate the carbon credits earned resulting from a cleaning of the turbine engine system 272. The optimization routine 238 weighs all of the inputs received by the cleaning schedule optimizer 232 and determines whether a cleaning is necessary.

Figure 3:
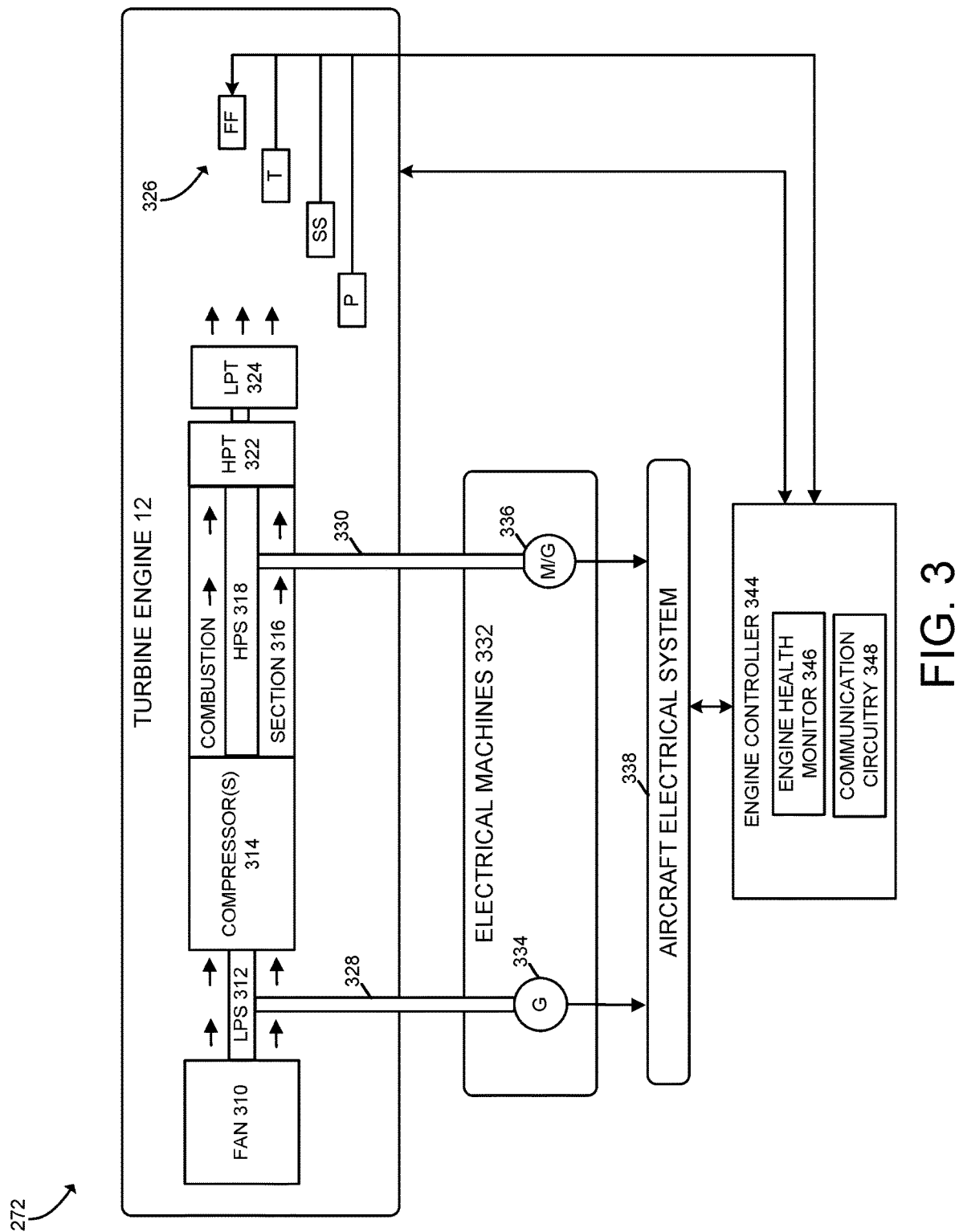
FIG. 3 is a simplified block diagram of at least one embodiment of the turbine engine system of FIG. 2.

The turbine engine 12 is a component of a turbine engine system 272 of an aircraft 270. An illustrative example of a turbine engine system 272 is shown in FIG. 3 and described below. As shown in FIG. 3, the illustrative turbine engine system 272 includes an engine controller 344, configured with an on-board engine health monitor 346 and communication circuitry 348. The engine controller 344 may be embodied as any suitable computing device or electrical circuitry capable of performing the functions described herein (e.g., as a microprocessor, controller, etc.). The communication circuitry 348 enables the engine controller 344 to communicate engine health data 410 collected in real time during operation of the turbine engine system 272 to other computing devices, such as the engine monitoring computing device 210, via a network 260 and/or a direct communication link (such as a cable, e.g., when the aircraft 270 is on the ground). While the fleet management system 200 shows a single aircraft 270 for simplicity, it should be understood that in practice, a number of different aircraft 270 may be connected with the fleet management system 200 in a similar fashion.

The illustrative fleet operations computing device 240 is a computing device configured to perform aircraft fleet management operations and is typically operated by the owner/operator of the aircraft 270. The fleet operations computing device 240 can receive data from, e.g., the associated turbine engine system 272 of an aircraft 270 in a fleet of aircraft, via, e.g., one or more network(s) 260. The fleet operations computing device 240 includes an engine usage database 250 and an engine maintenance history database 252. The engine usage database 250 stores information related to the operation of the turbine engine system 272, such as the number of trips made by the aircraft 270, the duration of those trips, the climate conditions in which the trips were made, the departure locations and arrival locations of those trips, the date and time of each trips, the weather conditions during each trips, and other aircraft operating data. The engine maintenance history database 252 stores information related to the maintaining of a turbine engine system 272 over time, such as, for example, when the next scheduled engine check-up or overhaul is to occur, the entire maintenance history of the turbine engine system 272, and other data related to the past or future maintenance of the turbine engine. The fleet operations computing device 240 may be embodied as any suitable computing device and/or electrical circuitry for performing the functions described herein. Accordingly, the remaining components of the fleet operations computing device 240 having the same name as above-described components of the engine monitoring computing device 210 may be embodied similarly; therefore, the description is not repeated here.

The illustrative cleaning operations computing device 280 is a computing device configured to manage engine cleaning services, and is typically operated by an engine cleaning service, such as the cleaning service 18. The cleaning operations computing device 280 is communicatively coupled to the network(s) 260. The cleaning operations computing device 280 includes an engine cleaning history database 292, and a cleaning parameters database 294. The engine cleaning database 292 stores information related to the cleaning history of the turbine engine system 272, such as, for example, when was the last cleaning of the turbine engine 12 and what cleaning was performed. In an alternative embodiment of the invention, the engine cleaning history can also be stored on the engine maintenance history database 252. The cleaning parameters database 294 includes information related to the cleaning regimens available to be used to clean a particular turbine engine 12, such as data on all available cleaning regimens, which cleaning regimens are available at which locations, whether a cleaning crew at a particular location is available to perform a cleaning, and other information related to the cleaning services 18. The cleaning operations computing device 280 may be embodied as any suitable computing device and/or electrical circuitry for performing the functions described herein. Accordingly, remaining components of the cleaning operations computing device 280 having the same name as above-described components of the engine monitoring computing device 210 may be embodied similarly; therefore, the description is not repeated here.

In general, references herein to a "database" may refer to, among other things, a computerized data structure capable of storing information in a manner that enables the stored information to be later retrieved, e.g., by a query (e.g., a keyword search) or a computer program command. Portions of each database may be embodied as, for example, a file, a table, an extensible markup language (XML) data structure, or a database. While not specifically shown, the fleet management system 200 may include other computing devices (e.g., servers, mobile computing devices, etc.), which may be in communication with each other and/or the engine monitoring computing device 210 via one or more communication networks 260, in order to perform one or more of the disclosed functions.

Additional features of the illustrative fleet wash management system 200 include the following. The system 200 can obtain historical data about the engine 12 or the engine's cleaning history, which the system 200 can use to better utilize an engine cleaning scheme for the owner operator. Some embodiments of the system 200 can be used in conjunction with a computing system of the engine manufacturer to schedule maintenance intervals based upon certain parts or modules that need replacement. A particular example of this would be where the system 200 determines that an engine merely needs a minor overhaul and thus initiates a cleaning. As a result, the engine is cleaned and returns to service, thereby extending the engine's efficiency until a major overhaul is required. The system 200 can issue a prompt or notification in order to prevent the occurrence of a scheduled cleaning cycle, if the system 200 determines that the engine's removal from service is imminent (e.g., for regularly scheduled required maintenance). In other words, the system 200 can coordinate cleaning cycles with other maintenance schedules as well as operational schedules. The system 200 can algorithmically establish the best variation of cycle times in which the optimum parameters of engine cleaning are determined, including the time interval between cleaning(s), the duration of cleaning(s), and the particular mixture or composition of the cleaning solution. The system 200 can monitor the engine autonomously, e.g., irrespective of whether an engine cleaning is currently being performed. For example, the system 200 can send a notification for a particular engine to e.g., the owner/operator, based on existing engine performance or maintenance intervals. The system 200 can establish a predictive cleaning schedule based on historical data. The predictive cleaning schedule can be used by, e.g., the engine manufacturer, in order to better predict engine cleaning as a function of minor and major overhaul intervals.

Referring now to FIG. 3, an embodiment of the turbine engine system 272 includes the turbine engine 12 and the engine controller 344. The engine controller 344 may be configured as, for example, a Full Authority Digital Engine Controller (FADEC), a component thereof, or as a separate module in communication with a FADEC (e.g., via one or more electronic communication links or networks). In some embodiments, the engine controller 344 includes an on-board engine health monitor 346, described in more detail below.

The illustrative turbine engine 12 is a multi-shaft turbofan gas turbine engine; however, aspects of the present disclosure are applicable to other types of turbine engines, including various types of turboprop and turboshaft systems, as well as turbine engines designed for non-aerospace applications. In the turbine engine 12, a fan 310 (e.g., a fan, variable pitch propeller, etc.) draws air into the engine 12. Some of the air may bypass other engine components and thereby generate propulsion thrust. The remaining air is forwarded to one or more compressors 314. In some embodiments, a low pressure (LP) compressor may increase the pressure of air received from the fan 310, and a high pressure (HP) compressor may further increase the pressure of air received from the low pressure compressor. In any event, the compressor(s) 314 increase the pressure of the air and forward the higher-pressure air to a combustion section 316. In the combustion section 316, the pressurized air is mixed with fuel, which is supplied to the combustion section 316 by a fuel supply such as a fuel injector (not shown). Typically, a flow meter, flow control valve, or similar device (e.g., a fuel flow sensor, FF 326) monitors and/or regulates the flow of fuel into the combustion section 316. An igniter (not shown) is typically used to cause the mixture of air and fuel to combust. The high-energy combusted air is directed to one or more turbines 322, 324. In the illustrative embodiment, a high pressure turbine 322 is disposed in axial flow series with a low pressure turbine 324. The combusted air expands through the turbines 322, 324, causing them to rotate. The combusted air is then exhausted through, e.g., a propulsion nozzle (not shown), which may generate additional propulsion thrust.

The rotation of the turbines 322, 324 causes engine shafts 312, 318, to rotate. More specifically, rotation of the low pressure turbine 324 drives the low pressure shaft 312, which drives the fan 310; while rotation of the high pressure turbine 322 drives the high pressure shaft 318, which drives the compressor(s) 314. In some embodiments, the shafts 312, 318 may be concentrically disposed. In some embodiments, more than two shafts 312, 318 may be provided. For example, in some embodiments, an intermediate shaft is disposed concentrically between the low pressure shaft 312 and the high pressure shaft 318 and supports an intermediate-pressure compressor and turbine.

The illustrative turbines 322, 324 additionally drive one or more electrical machines 332, e.g., via "more electric" technology and/or power take-off assemblies 328, 330. The low pressure turbine 324 drives a generator 334 via the low pressure shaft 312 and a power take-off assembly 328. The high pressure turbine 322 drives a motor/generator 336 via the high pressure shaft 318 and a power take-off assembly 330. The electrical machines 332 can generate power, which may be supplied to an aircraft electrical system 338. For instance, the generator 334 may generate electrical power that is supplied to other components or systems of the aircraft 270 or other vehicle to which it is coupled. The motor/generator 336 may operate similarly, but may additionally have a motor mode in which it receives electrical energy from, for example, the aircraft electrical system 338, and converts the received electrical energy into rotational power, which is then supplied to the high pressure turbine 322 via the power take-off assembly 330.

The illustrative engine controller 344 controls the overall operation of the engine 12. For example, the engine controller 344 controls the rate of fuel flow to the combustion section 316, as well as the airflow through the engine 12 (e.g., by varying the pitch angle of vanes of the fan 310). The engine controller 344 receives signals from a number of different sensors 326, which are installed at various locations on the engine 12 to sense various physical parameters such as temperature (T), shaft speed (SS), air pressure (P), and fuel flow (FF), which represent various aspects of the current operating condition of the engine 12. The sensors 326 transmit data signals representing the sensed information to the engine controller 344. In response to the sensor signals, the engine controller 344 supplies various commands to the engine 12 to control various aspects of the operation of the engine 12. Additionally, the engine controller 344 utilizes the sensor signal to perform engine health monitoring.

The engine health monitor 346 provides engine health monitoring and prognostics by monitoring the efficiency of the engine 12 as it relates to engine performance, based on the sensor signals received from time to time by the engine controller 344. While shown in FIG. 3 as a sub-module of the engine controller 344, the engine health monitor 346 may be embodied as a stand-alone unit or as a sub-module of another computer system. The engine health monitor 346 monitors the health of the engine 12 by looking at fuel efficiency, engine speed, engine temperature and/or other desired parameters, which are obtained or derived from the sensor signals transmitted by the sensors 326.

The illustrative engine health monitor 346 compares the real-time engine operating conditions to an established "healthy engine" profile. The healthy engine profile may be developed over time using model-based control algorithms. Based on the comparison of the real-time operating conditions to the healthy engine profile, the engine health monitor 346 algorithmically generates engine health predictions. The engine health predictions may be different for each engine and for different operating conditions, but the data for any engine can be gathered in a test cell and then incorporated into the model-based engine health monitoring algorithms. An illustrative example of an engine health monitor utilizing algorithms is established when the engine 12 is tested within a test cell for the purpose of proving that the engine 12 has achieved desired certification and reliability requirement limits. This test information for specific engines is transferred to engine health monitoring units (such as the engine health monitor 346), and then, on-wing, the measured engine output is compared to or validated against test cell predictions. This will consent engine to engine model variability within engine repeatability. For instance, turbine temperature measured in a test cell is compared with on-wing temperature measurements following standard day and model corrections. If the variation (e.g., the difference between the measurements obtained in the test cell and the measurements obtained on-wing) exceeds installation effects, then the system can conclude that the turbine temperature is deteriorating over time. A trigger limit is set for each parameter or combination of parameters that sets or is used to determine the need for a desired maintenance action. In the above example, low turbine temperature margin results in nucleated foam wash at or within a certain time period.

Figure 4:
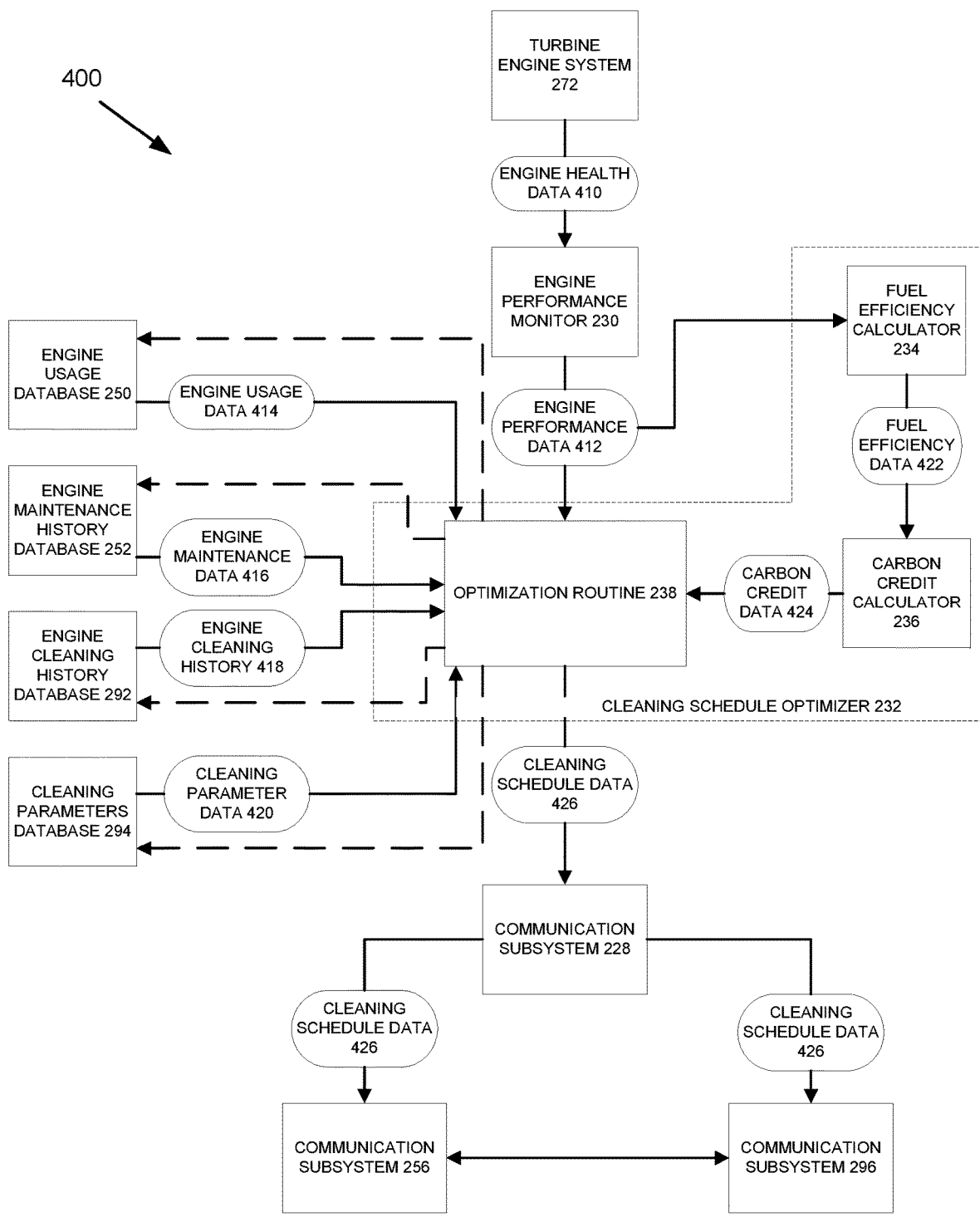
FIG. 4 is a simplified schematic diagram showing an environment of the system of FIG. 2, including interactions between the components of the system of FIG. 2.

Referring now to FIG. 4, a simplified schematic diagram shows components of the computing system 200 in an operational environment 400 (e.g., interacting at runtime). The components of the fleet management system 200 shown in FIG. 4 may be embodied as computerized programs, routines, logic, data and/or instructions executed or processed by one or more of the computing devices 210, 240, 280, 344. Beginning at the top of FIG. 4, the engine health monitor 346 of the turbine engine system 272 obtains (e.g., via the sensors 326) and outputs engine health data 410 to the engine performance monitor 230.

The engine performance monitor 230 may be embodied as a system that uses the real-time feedback of engine health data 410 from the turbine engine system 272 to determine the health of the turbine engine 12 and/or one or more other components of the turbine engine system 272. The engine health data 410 may include measurements of engine speed, engine temperature, fuel efficiency, oil pressure, oil temperature, DC voltage, engine torque, engine pressure and/or other indicators of turbine engine performance. The engine performance monitor 230 utilizes the engine health data 410 to generate one or more engine performance data 412 (e.g., one or more parameters, such as an indicator of engine performance, such as a data value or a plot of data values). An alternative embodiment of the engine performance monitor 230 includes receiving engine performance parameters directly from the engine health monitor 346 of the turbine engine system 272. Alternatively or in addition, the computing and tracking of engine health monitoring data over time can be done by one or more external computing systems and transmitted to the engine performance monitor 230 (e.g., by a network 260).

The engine performance data 412 are output to the optimization routine 238 of the cleaning schedule optimizer 232. The optimization routine 238 determines whether a cleaning of the turbine engine 12 would improve performance of the turbine engine system 272 enough to justify initiating a cleaning or establishing a cleaning schedule. Determination of compressor fouling (e.g., whether cleaning is needed as a result of the compressor's condition) can be challenging. If there is any evidence that a maintenance action is required for another cause, such as bleed leak, hot section deterioration or fluctuation in any one of the performance parameters, then action should be taken by the system to minimize those other causes. In one method of optimization the system ranks or weights different criteria or parameters used in the optimization routine. For example, if turbine temperature or core speed margin is below a minimum limit, then a rank 1 is assigned in the optimization routine, if margins are at certain range then a rank 2 is assigned, and detection of a combination of margins is assigned to rank 3. Similarly, if time since last wash is achieved to maximum limit then rank 1 is assigned. Based on the optimization routine rank assignment(s), the next available maintenance opportunity for the aircraft and ground equipment availability, the optimizer assesses the need for a cleaning, generates a cleaning schedule, and notifies user, such as the cleaning crew and/or an airline operations or maintenance team, of the need for cleaning and/or the cleaning schedule. The optimization routine can provide not just one available cleaning option but can also list multiple possible cleaning opportunities.

In an alternative embodiment, the engine performance monitor 230 only outputs engine performance data 412 to the optimization routine 238 after a certain level of degradation of engine performance has been detected. The illustrative cleaning schedule optimization routine 238 receives other information from a number of different sources. For example, the optimization routine 238 utilizes engine usage data 414, which may be obtained from the engine usage database 250; engine maintenance data 416, which may be obtained from the engine maintenance history database 252; engine cleaning history data 418, which may be obtained from an engine cleaning history database 292; and cleaning parameter data 420, which may be obtained from the cleaning parameters database 294. The various source of data provide, for example, engine-specific information concerning the turbine engine system 272 and the possible cleaning options.

The fuel efficiency calculator 234 of the cleaning schedule optimizer 232 utilizes the engine performance data 412 to compute an estimate of improved fuel efficiency. The carbon credit calculator 236 of the cleaning schedule optimizer 232 utilizes the fuel efficiency data 422 to compute carbon credit data 424 (e.g., an estimate of carbon credits that can be earned). The optimization routine 238 utilizes the computed data (e.g., carbon credit data and/or fuel efficiency data 422), as well has engine health, engine performance, and other data mentioned above, to determine the type of cleaning that is likely (e.g., statistically) to be most effective, and computes the associated cleaning schedule for the turbine engine 12 (or more generally, for the aircraft 270) based on the received information or estimates, or a combination thereof.

For example, in some embodiments, based on the engine performance data 412 received from the engine performance monitor 230, the cleaning schedule optimizer 232 queries a number of databases for information regarding the turbine engine system 272 that is experiencing a degradation of engine performance. The cleaning schedule optimizer 232 queries the engine usage database 250 for engine usage data 414. The engine usage data 414 can include data regarding the types of flights aircraft 270 has flown, the departure and destination locations of the aircraft 270, the date and time of flights of the aircraft 270, the climate and weather data regarding where the aircraft 270 operated, and other contextual data that provides information about the operating environment of the aircraft 270 and the associated turbine engine system 272. The cleaning schedule optimizer 232 queries the engine maintenance history database 252 for engine maintenance data 416. The engine maintenance data 416 can include a log of maintenance performed on the turbine engine system 272, including dates of the service, the dates of scheduled maintenance, and possibly, the cleaning history of the turbine engine system 272. The cleaning schedule optimizer 232 queries the engine cleaning history database 292 to obtain engine cleaning history 418. The engine cleaning history 418 includes information from the cleaning service 18 regarding past cleanings performed on the turbine engine 12, such as the cleaning regimens performed, the location at which the cleaning was performed, and when the cleaning was performed (e.g., date and time). The cleaning schedule optimizer 232 also queries a cleaning parameters database 294 for cleaning parameter data 420. Cleaning parameter data 420 can include data about all of the available cleaning regimens, the locations at which cleaning processes regimens are available, and the availability, or schedule, of the cleaning units 10 that are available to perform the cleanings to clean an aircraft 270 at a particular location.

The cleaning schedule optimizer 232 also takes the engine performance data 412 and applies it to a fuel efficiency calculator 234. The fuel efficiency calculator 234 calculates the fuel efficiency of the turbine engine 12 based on the engine performance data 412. The fuel efficiency calculator 234 also compares the current fuel efficiency data 422 against past fuel efficiency data 422 of the turbine engine 12 to estimate an improvement in fuel efficiency due to the turbine engine 12 having received a cleaning. The fuel efficiency calculator 234 can also consider past improvements in fuel efficiency after the turbine engine 12 received a cleaning and/or an estimate of the effectiveness of a particular regimen when determining an estimate of improvement in fuel efficiency. The fuel efficiency data 422 that is output by the fuel efficiency calculator 234 can include the current fuel efficiency of the turbine engine 272 and the estimated improvement in fuel efficiency due to a cleaning.

The carbon credit calculator 236 receives the fuel efficiency data 422 and calculates an estimate for carbon credits earned, based on the estimate of the improvement in fuel efficiency of the turbine engine 272 after a cleaning. Carbon credits are generally calculated by estimating a specific fuel-consumption improvement and applying a carbon credit conversion. The exact amount of the carbon credit conversion is variable based on the applicable laws regulating carbon emissions. Once an estimate of carbon credits earned is determined, the carbon credit calculator 236 outputs carbon credit data 424 to the optimization routine 238.

The optimization routine 238 utilizes the data received by the cleaning schedule optimizer 232, including the engine performance data 412, the engine usage data 414, the engine maintenance data 416, the engine cleaning data 418, the cleaning parameter data 420, the fuel efficiency data 422, and the carbon credit data 424. The optimization routine 238 determines whether a cleaning would maximize cost savings for the owner/operator of the aircraft 270. For example, the optimization routine 238 would likely determine that a cleaning is necessary when the engine performance of the turbine engine system 272 has degraded past a certain point and the next scheduled overhaul of the engine is many hours away. In contrast, if the engine performance has degraded, but the next scheduled engine overhaul is scheduled to occur in a few hundred hours of flight time for the aircraft 270, the optimization routine 238 would likely find that a cleaning is not necessary because the cleaning would only be effective for a short period of time before the engine overhaul was done. Another factor that the optimization routine 238 would consider are what types of environments and weather the aircraft 270 has been operating in. Certain types of cleaning regimens are more likely to be effective against certain types of grime and dirt that are prevalent in certain environments.

In some embodiments, the optimization routine 238 is a function of low turbine temperature margin (minimum limit), low core speed margin (minimum limit), time (and or cycle) since last wash (maximum limit), chosen fuel consumption reduction and environmental conditions such as marine or high air quality index. In other words, the optimization routine performs mathematical computations (e.g., one or more optimization algorithms) using one or more of the foregoing pieces of information as arguments or parameters. Once the optimization routine 238 has determined that a cleaning is necessary or recommended, the cleaning schedule optimizer 232 outputs cleaning schedule data 426. The cleaning schedule data 426 can include a simple notification that a cleaning is due delivered to the cleaning service 18 and/or to the owner/operator of the aircraft 270, or may include a scheduling request directed to both the cleaning service and the owner/operator. Alternatively, the cleaning schedule optimizer 232 can directly initiate or schedule the cleaning and cause the aircraft 270 to receive a cleaning at a particular location, likely between flights so as to not interrupt the flight schedule of the aircraft 270. The cleaning schedule data 426 is output from engine monitoring computing device 210 through communication subsystem 228 and received by communication subsystem 256 of the fleet operations computing device 240 and received by communication subsystem 296 of the cleaning operations computing device 280. In some embodiments, after receiving cleaning schedule data 426, communication subsystems 256 and 296 communicate directly with each other to finalize the scheduling for the cleaning of the turbine engine 12.

Figure 5:
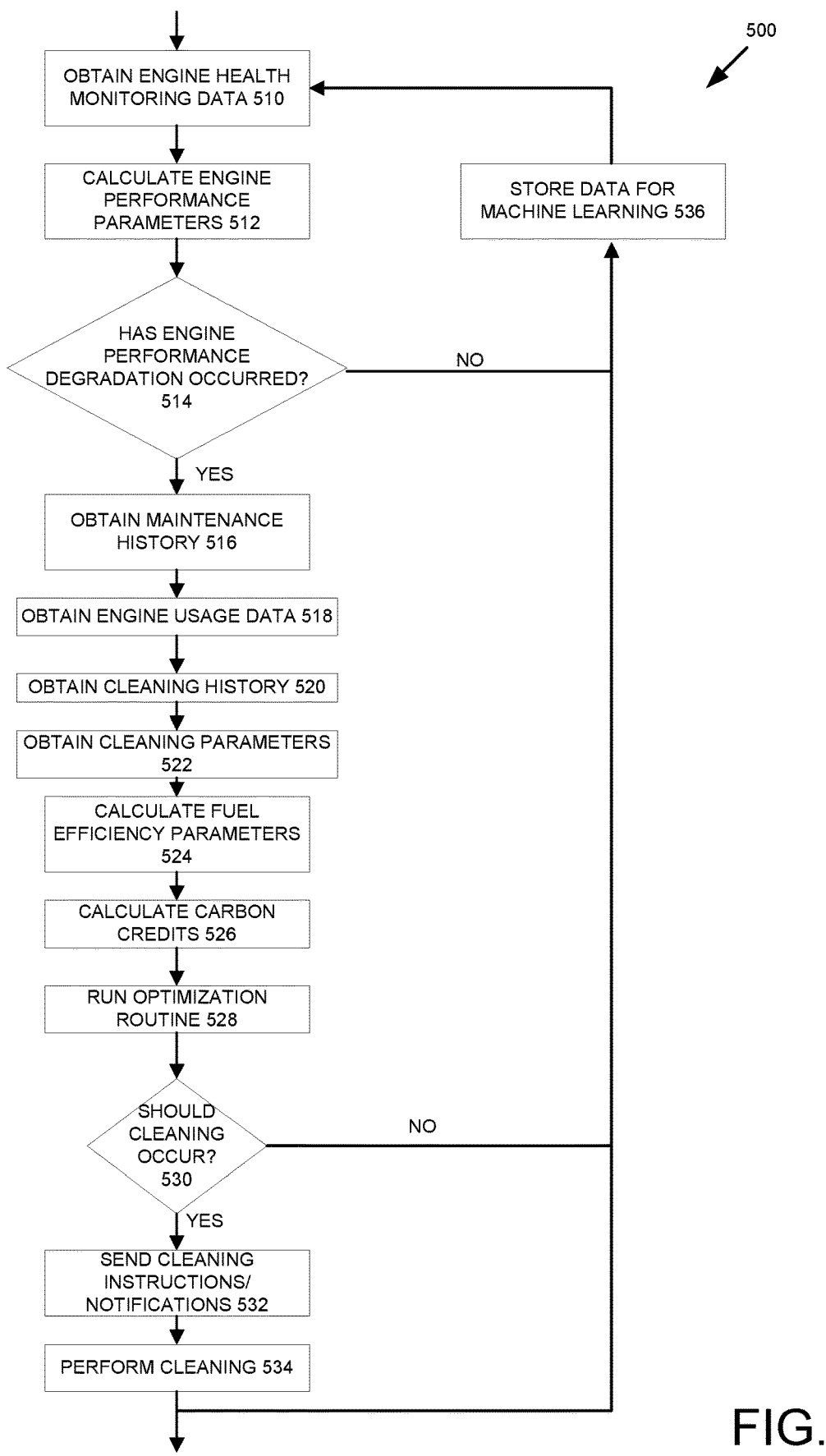
FIG. 5 is a simplified flow diagram of at least one embodiment of a method for optimizing engine cleaning, which may be performed by one or more components of the system of FIG. 2, as disclosed herein.

Referring now to FIG. 5, an illustrative method 500 for analyzing whether a cleaning would maximize engine performance, while minimizing operating costs of the engine, is shown. Aspects of the method 500 may be embodied as computerized programs, routines, logic and/or instructions executed by the fleet management system 200, for example by one or more of the modules 230, 232, 234, 236, 238, 250, 252, 292, and 294. At block 510, the system 200 obtains engine health monitoring data 510 from the turbine engine system 272. The engine health monitoring data may include measurements of engine speed, engine temperature, fuel efficiency, oil pressure, oil temperature, DC voltage, engine torque, engine pressure and other indicators of engine performance. The system 200 may obtain the engine health monitoring data by, for example, receiving user-generated or system-generated input via the user interface subsystem 226 and/or the communication subsystem 228. At block 512, the system 200 calculates engine performance parameters based on the engine health data received. The engine performance parameters provide information about the engine's performance over time including the temperature, engine speed, fuel consumption, and other parameters. At block 514, the system 200 analyzes the engine performance parameters to determine if the engine has experienced a significant drop in engine performance. Engine performance may degrade when, for example, the operating temperature of the engine increases, the speed of the engine decreases, or the fuel consumption of the engine increases. These types of patterns can show that the turbine engine is experiencing greater resistive forces, which could include dirt and grime build up in the turbine engine. If no significant engine performance has occurred then, at block 536, the information is stored in the machine learning database 222 for future use in machine learning applications, and the system 200 continues to check engine performance parameters, either continuously or periodically, until the performance of the engine degrades.

If at block 514, the system 200 determines that the engine performance has degraded significantly then the engine performance parameters are passed to the cleaning schedule optimizer 232 to optimize a cleaning schedule. As part of the optimization process, at block 516, 518, 520, and 522, the system 200 obtains information, generally stored on other databases, for use in its optimization algorithm. The fleet management system 200 may obtain the relevant by, for example, receiving user-generated or system-generated input via the user interface subsystem 226 and/or the communication subsystem 228. At block 516, the system 200 obtains the maintenance history of the engine. At block 518, the system 200 obtains the engine usage data. At block 520, the system 200 obtains the cleaning history of the engine. At block 522, the system 200 obtains the maintenance parameters of the cleaning regimen. These types of data, and their relevant sources, have been described above and may be embodied similarly, therefore, the description is not repeated here.

At block 524, the system 200 calculates the fuel efficiency parameters of the engine, including tracking past fuel efficiency measures, tracking the current fuel efficiency of the engine, and providing a simple estimate of a future improvement in fuel efficiency. The fuel efficiency parameters are used, at block 526, to calculate an estimate of carbon credits earned based on the estimated improvement in specific fuel consumption.

At block 528, the optimization routine 238 is executed. The optimization routine 238 considers all of the data received by the cleaning schedule optimizer 232 and algorithmically determines whether a cleaning should occur, at block 530. The optimization routine 238 considers the past maintenance history of the engine 12, where the engine has been operating, past cleanings of the engine 12, and what future maintenance is scheduled. The optimization routine 238 also considers the likely effectiveness of the cleaning regimens available. These considerations generally include analyzing where the engine has been operating, determining what types of dirt and grime are in the engine compartment, also considering what types of flights and use the engine has been receiving. If the degradation of the engine performance can be explained by dirt build-up in the engine and the engine compartment, the optimization routine 238 is likely to suggest a cleaning. Other factors that the optimization routine 238 may consider include the estimated cost of the cleaning, both the direct cost of the cleaning and any indirect costs that can result from taking an aircraft out of service temporarily. Cost savings are also considered, including carbon credits earned and the reduced costs that are associated with increased fuel efficiency. If the optimization routine 238 determines that no cleaning should take place then the data gathered is stored in the machine learning database 222 to help the fleet management system 200 use more predictive models when determining whether a cleaning is necessary.

If a cleaning is necessary, at block 532, the fleet management system 200 initiates a cleaning, e.g., by sending out schedule notifications. The system 200 may send the scheduling notifications by, for example, transmitting a user-generated or system-generated output via the communication subsystem 228. The types of scheduling notifications can take a number of different forms including a gentle reminder sent to the interested parties that cleaning for a particular turbine engine is suggested, sending out an invitation to accept a specific date and time for a cleaning, or scheduling a cleaning automatically. The interested parties are, generally, the owner/operator of the turbine engine 12 and the cleaning service 18 responsible for cleaning the engine. At block 534, the cleaning is performed, e.g., in response to receiving a cleaning notification. Following block 534; the method 500 may conclude or proceed to block 536.

At block 536, the data for the cleaning of the engine is store in the machine learning database 222 for future use. Machine learning involves the execution of mathematical algorithms on samples of data collected over time, in order to discern patterns in the data that can be used to predict the likelihood of occurrence of future instances of the same data. In the predictive process of determining an optimum time to provide a cleaning to a turbine engine, machine learning algorithms can be used to improve the optimization algorithms. The data from the different stages of the optimization process is stored, as well as the final outcomes, so that future uses of the optimization algorithm can be adjusted to better meet the needs of those using the cleaning management system. After the data has been stored in the machine learning database 222, or following block 534 in some embodiments, the system 200 returns to block 510.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A method for optimizing cleaning of a turbine engine adapted for use in an aircraft that is executed by one or more computing devices, the method comprising:
   receiving, by a communication link between the turbine engine and a cleaning schedule optimizer, engine health data from the turbine engine over time during operation of the turbine engine;

periodically executing, by the cleaning schedule optimizer, a cleaning optimization routine to evaluate instances of the engine health data using one or more cleaning schedule optimization criteria;

querying, by the cleaning schedule optimizer, an operational database to obtain information about the use of the turbine engine and incorporating the turbine engine use information into the optimization routine; and in response to one or more instances of the engine health data meeting an engine health criterion, causing a foamed cleaning agent to be discharged into the turbine engine according to an optimized engine cleaning schedule, wherein the turbine engine use information includes at least one of (i) flight types of the aircraft, (ii) departures and destinations of different flights of the aircraft, (iii) dates and times of the different flights of the aircraft, and (iv) climate and weather during the different flights of the aircraft;

wherein the method further comprises ranking, by the cleaning schedule optimizer, the one or more cleaning schedule optimization criteria;

assessing, by the cleaning schedule optimizer, the ranking of the one or more cleaning schedule optimization criteria, an availability of maintenance for the aircraft, and an availability of ground equipment for the maintenance; and indicating the engine health data meets the engine health criterion based on the assessment by the cleaning schedule optimizer.

2. The method of claim 1, wherein periodically executing the cleaning optimization routine comprises executing the cleaning optimization routine in response to determining that engine performance is degrading.

3. The method of claim 1, further comprising querying, by the cleaning schedule optimizer, an environmental database for information about operating environments of the turbine engine and incorporating the operating environment information into the optimization routine.

4. The method of claim 1, further comprising querying, by the cleaning schedule optimizer, a maintenance database for information about the maintenance history of the turbine engine and incorporating the maintenance history information into the optimization routine.

5. The method of claim 1, further comprising querying, by the cleaning schedule optimizer, a cleaning parameters database for information about the different cleaning regimens available for use on the turbine engine and incorporating the cleaning regimen information into the optimization routine.

6. The method of claim 1, further comprising receiving, by a fuel efficiency calculator electrically connected to an engine health monitor, one or more engine performance parameters and generating fuel efficiency parameters based upon the received engine performance parameters.

7. The method of claim 6, further comprising calculating, by the fuel efficiency calculator, changes in fuel consumption in the engine over time.

8. The method of claim 7, further comprising calculating, by the fuel efficiency calculator, changes in operating cost over time based on the changes in fuel consumption over time.

9. The method of claim 6, further comprising receiving, by a carbon credit calculator, the fuel efficiency parameters and the engine performance parameters, estimating a change in fuel consumption based upon the optimized cleaning schedule, and using the estimated change in fuel consumption to calculate an estimated number of carbon credits earned.

10. The method of claim 9, further comprising sending, by a notification system in communication with the cleaning schedule optimizer and coupled to a network, a notification to an owner of the turbine engine, and wherein the notification comprises the cleaning schedule, the estimated fuel consumption, and the estimated carbon credits.

11. The method of claim 3, wherein the operating environment information includes at least one of (i) types of environments the aircraft operated in during different flights and (ii) types of weather the aircraft operated in during different flights.

12. The method of claim 5, wherein the information about the different cleaning regimens includes locations at which the different cleaning regimens are available and the number of cleaning units available at a particular location.

* * * * *